United States Patent [19]

Kadis et al.

[11] Patent Number: 5,065,607
[45] Date of Patent: Nov. 19, 1991

[54] PISTON AND CYLINDER ASSEMBLY

[75] Inventors: Paul M. Kadis, Chardon; Leonard L. Hiney, Ravenna, both of Ohio

[73] Assignee: Teledyne Industries, Inc., Cleveland, Ohio

[21] Appl. No.: 596,468

[22] Filed: Oct. 12, 1990

Related U.S. Application Data

[63] Continuation-in-part of Ser. No. 429,200, Oct. 30, 1989, Pat. No. 5,003,807.

[51] Int. Cl.$^5$ ............................................. B21D 24/14
[52] U.S. Cl. ......................................... 72/351; 92/52; 267/119
[58] Field of Search ............ 72/350, 351, 417, 453.13; 92/52; 267/119

[56] References Cited

U.S. PATENT DOCUMENTS

| 451,846 | 5/1891 | Bachman . | |
|---|---|---|---|
| 2,420,409 | 5/1947 | Bivans et al. . | |
| 2,434,296 | 1/1948 | Swanson . | |
| 2,464,962 | 3/1949 | Bent | 92/52 |
| 3,112,705 | 12/1963 | Chlebowski . | |
| 4,723,479 | 2/1988 | Gallentine . | |

Primary Examiner—Lowell A. Larson
Attorney, Agent, or Firm—Tarolli, Sundheim & Covell

[57] ABSTRACT

An improved press assembly has upper and lower draw rings which grip a workpiece. During closing of the press assembly, an improved control assembly accelerates the lower draw ring to a first speed and then to a second speed before the upper and lower draw rings move together. Similarly, during opening of the press assembly, the control assembly decelerates the lower draw ring to a first speed and then decelerates the lower draw ring to a second speed prior to stopping of the lower draw ring. The control assembly includes a two stage piston and cylinder assembly. The piston and cylinder assembly includes an inner piston and a hollow outer piston which encloses the inner piston. The inner piston is engagable with a flange on the outer piston to move the outer piston with the inner piston.

32 Claims, 7 Drawing Sheets

PISTON AND CYLINDER ASSEMBLY

This application is a continuation-in-part of application Ser. No. 429,200, filed Oct. 30, 1989 by John Terrell, Paul Kadis, Leonard Hiney, and Susan Pfaff, and entitled "Press Assembly and Method of Operation", now U.S. Pat. No. 5,003,807 granted Apr. 2, 1991. The benefit of the earlier filing date of the aforesaid application Ser. No. 429,200 has been and hereby is claimed for all common subject matter.

BACKGROUND OF THE INVENTION

The present invention relates to a piston and cylinder assembly.

Piston and cylinder assemblies are commonly used either as fluid motors or as fluid pumps. When a piston cylinder assembly is being used as a pump, a piston is usually moved relative to a cylinder to expel fluid from the cylinder at a predetermined rate with each increment of movement of the piston relative to the cylinder. However, under certain circumstances, it is advantageous to have fluid expelled from the cylinder at a first rate during a first portion of the movement of a piston and to have fluid expelled from a cylinder at a second rate during a second portion of the movement of the piston.

A two stage piston and cylinder assembly is disclosed in U.S. Pat. No. 2,434,296. This patent discloses a manually actuated pump in which a control handle can be raised against the influence of a biasing spring then moved downwardly to move a relatively small inner piston relative to an outer piston and a cylinder. As this occurs, fluid is expelled from the cylinder at a first, relatively low rate. As the handle continues to be lowered, a second, relatively large piston, moves with the first piston. As the two pistons move downwardly together, fluid is expelled from the cylinder at a second rate which is greater than the first rate.

A press assembly having upper and lower draw rings which grip a workpiece is disclosed in U.S. patent application Ser. No. 429,200 filed Oct. 30, 1989 by John Terrell, Paul Kadis, Leonard Hiney, and Susan Pfaff and entitled "Press Assembly and Method of Operation." During opening of the press assembly, the lower draw ring is accelerated by a control assembly before the upper and lower draw rings move together. During closing of the press assembly, the control assembly effects deceleration of the lower draw ring.

SUMMARY OF THE INVENTION

The present invention provides an improved piston and cylinder assembly. The piston and cylinder assembly includes a hollow outer piston which is disposed in a cylinder and cooperates with the cylinder to define variable volume cylinder chambers. An inner piston is disposed within the hollow outer piston and cooperates with a cylindrical inner side surface of the outer piston to define variable volume piston chambers. A piston rod is connected with the inner piston and extends from one end of the cylinder.

The hollow outer piston includes a first flange which extends radially inwardly from the first end of the hollow outer piston. The hollow outer piston also includes a second flange which extends radially inwardly from a second end of the hollow outer piston. During a portion of an operating stroke of the piston and cylinder assembly, the inner piston is moved relative to the outer piston. During another portion of an operating stroke of the piston and cylinder assembly, the inner piston engages one of the two flanges on the hollow outer piston to move the hollow outer piston with the inner piston. When the hollow outer piston moves with the inner piston, the effective area of the piston and cylinder assembly is the combined areas of the two pistons. However, when the inner piston moves relative to the outer piston, the effective area of the piston cylinder assembly is only the area of the inner piston.

The improved piston and cylinder assembly is advantageously used as a control assembly in a press. During operation of the press, upper and lower draw rings or members move together and apply pressure to opposite sides of a workpiece. During operation of the press from an open condition to a closed condition, the piston and cylinder assembly effects movement of a draw ring at a first speed and then accelerates the draw ring to a second speed before the two draw rings move together. During operation of the press from the closed condition to the open condition, the piston and cylinder assembly retards operation of a cushion assembly to reduce the speed of movement of one of the draw rings relative to the other draw ring.

Accordingly, it is an object of this invention to provide a new and improved piston and cylinder assembly wherein an inner piston is movable relative to a hollow outer piston during a portion of an operating stroke of the piston and cylinder assembly and wherein the inner piston and hollow outer piston are movable together during another portion of the operating stroke of the piston and cylinder assembly.

Another object of this invention is to provide a new and improved control assembly for effecting acceleration of a draw ring or other member in a press during operation of the press from an open condition to a closed condition.

Another object of this invention is to provide a new and improved control assembly for retarding movement of a draw ring or other member in a press during operation of the press from the closed condition to an open condition.

BRIEF DESCRIPTION OF THE DRAWINGS

The foregoing and other objects and features of the present invention will be more apparent upon a consideration of the following description taken in connection with the accompanying drawings wherein.

DESCRIPTION OF SPECIFIC PREFERRED EMBODIMENTS OF THE INVENTION

Press Assembly—General Description

Figure 1:
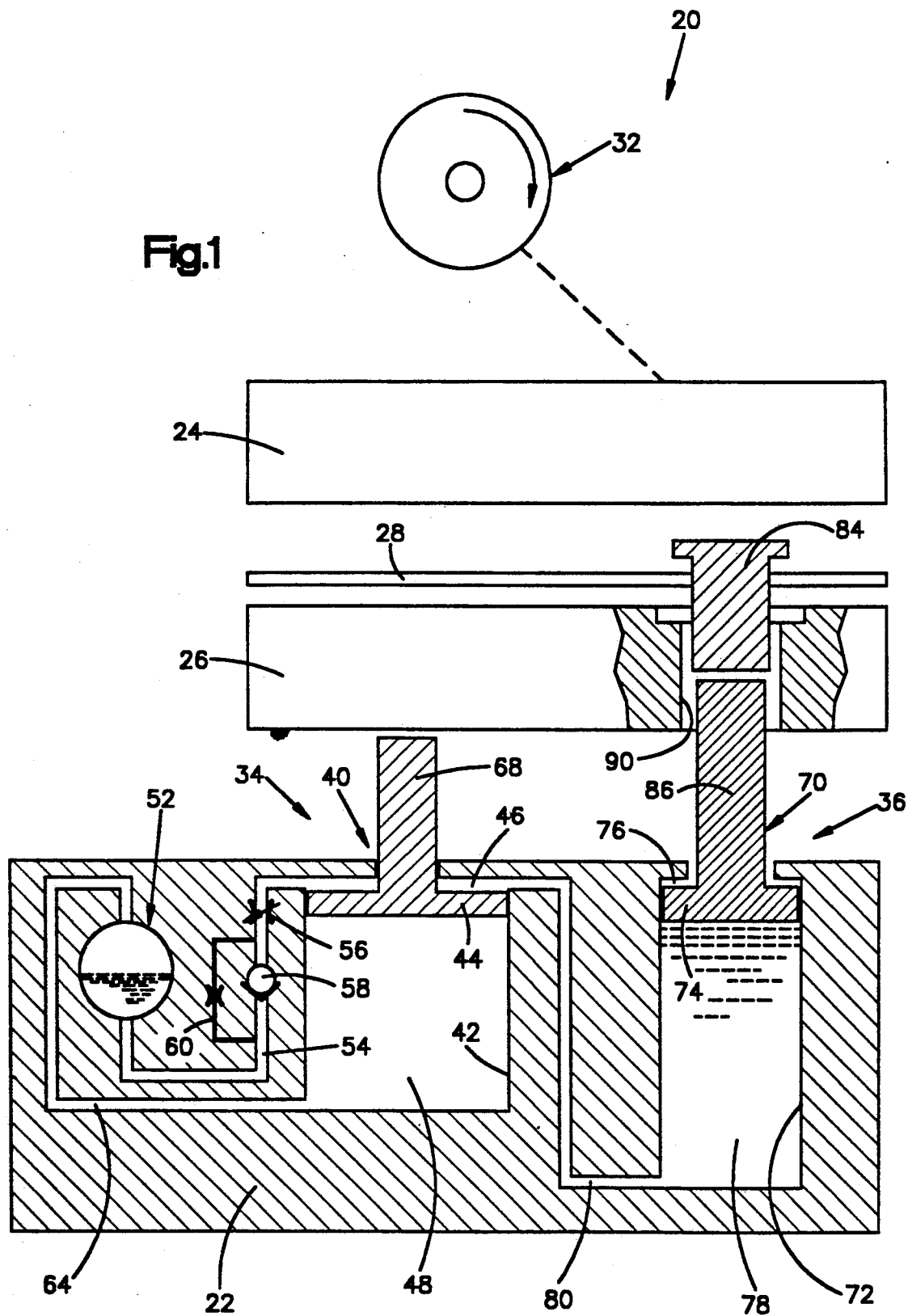
FIG. 1 is a schematic illustration of a press assembly having a control assembly which cooperates with a cushion assembly to accelerate and decelerate a draw ring during operation of the press assembly.

An improved press assembly 20 is illustrated schematically in FIG. 1. The press assembly 20 includes a stationary base 22. An upper draw ring or member 24 cooperates with a movable lower draw ring or member 26 during operation of the press assembly to deform a sheet metal workpiece 28. During operation of the press assembly 20, the upper and lower draw rings 24 and 26 are operable to apply pressure to opposite sides of the sheet metal workpiece 28 to firmly grip the workpiece between the draw rings. Once the workpiece 28 has been gripped between the upper and lower draw rings 24 and 26, the draw rings are lowered deform the workpiece around a die (not shown) in a stretch forming operation.

The upper and lower draw rings or members 24 and 26 have a generally rectangular configuration with an open central portion. The openings in the central portions of the upper and lower draw rings 24 and 26 have configurations corresponding to the configurations of the die around which the workpiece 28 is to be drawn. It should be understood that the upper and lower draw rings 24 and 26 have only been shown very schematically in the drawings and may have any desired configuration.

When the press assembly 20 is operated to stretch draw the sheet metal workpiece 28, a drive assembly 32 moves the upper draw ring 24 downwardly toward the workpiece 28. As the downward motion of the upper draw ring 24 continues, the upper draw ring and workpiece 28 impact against the lower draw ring 26 to firmly grip the edges of the sheet metal workpiece. The upper and lower draw rings 24 and 26 are then lowered together to stretch the workpiece 28 over the lower die and thereby deform the workpiece.

A cushion assembly 34 is mounted on the base 22. The cushion assembly 34 applies a yieldable force to the lower draw ring 26. This yieldable force opposes downward movement of the lower draw ring 26 during operation of the press assembly to a closed condition. Thus, the cushion assembly 34 cushions movement of components of the press assembly 20 during the closing of the press assembly. Although only a single cushion assembly 34 has been shown schematically in the drawings, it should be understood that the press assembly 20 includes a plurality of cushion assemblies 34.

A control assembly 36 is operable to effect acceleration of the lower draw ring 26 before the upper draw ring 24 closes on the lower draw ring. In addition, the control assembly 36 is operable to effect deceleration of the lower draw ring 26 before it is stopped at the initial position shown in FIG. 1 during operation of the press assembly 20 from a closed condition to an open condition. By accelerating the lower draw ring 26 during closing of the press assembly 20, shock loading is reduced when the upper draw ring 24 and workpiece 28 are impacted against the lower draw ring 26. By decelerating the lower draw ring 26 during opening of the press assembly 20, rebounding of the lower draw ring 26 and press vibration are reduced as the lower draw ring is stopped at its initial position. Although only a single control assembly 36 has been shown schematically in the drawings, it should be understood that the press assembly 20 includes a plurality of control assemblies 36.

Cushion Assembly

The cushion assembly 34 includes a piston and cylinder assembly 40. The piston and cylinder assembly 40 includes a cylinder 42 which is connected with the base 22. A piston 44 divides the cylinder 42 into upper and lower variable volume chambers 46 and 48. The upper variable volume chamber 46 contains hydraulic fluid and is connected in fluid communication with an accumulator 52 through a conduit 54.

An adjustable flow control orifice 56 is provided in the conduit 54 to restrict hydraulic fluid flow through the conduit to a relatively low rate. A check valve 58 blocks hydraulic fluid flow from the variable volume chamber to the accumulator 52 through the main conduit 54. However, a restricted bleed passage 60 enables a small amount of hydraulic fluid to flow from the accumulator 52 to the upper variable volume chamber 46 in the cushion assembly 34 to compensate for any leakage of hydraulic fluid from the chamber.

The lower variable volume chamber 48 in the cushion assembly 34 is filled with a gas, specifically nitrogen. The lower variable volume chamber 48 is connected with the accumulator 52 through a conduit 64. The accumulator 52 is pressurized to maintain a predetermined minimum fluid pressure in the lower variable volume chamber 48.

During operation of the press assembly 20 from an open condition (FIG. 1) to a closed condition, the lower draw ring 26 is supported by an upwardly extending piston rod 68 connected with the piston 44. As the press assembly 20 closes, the lower draw ring 26 moves the piston 44 downwardly and decreases the size of the lower variable volume chamber 48. As the gas in the lower variable volume chamber 48 is compressed, the cushion assembly 34 applies a yieldable force against the lower draw ring 26.

As the press assembly 20 is operated from the closed condition back to the open condition, the cushion assembly 34 applies a force against the lower draw ring 26 to support the lower draw ring and move it back to the initial position shown in FIG. 1. As this happens, the lower variable volume chamber 48 increases in size. Although the size of the lower variable volume chamber 48 increases and the fluid pressure in the chamber 48 may tend to decrease, the fluid pressure is more than sufficient to maintain the piston 44 in the extended position shown in FIG. 1 and to support the lower draw ring 26.

Although only a single cushion assembly 34 has been shown in FIG. 1, it should be understood that there are a plurality of identical cushion assemblies to support the lower draw ring 26 and apply a yieldable force against the lower draw ring during closing of the press assembly. Thus, there is a rectangular array of cushion assemblies 34 to support the lower draw ring 26.

Control Assembly

The control assembly 36 is operable to effect acceleration of the lower draw ring 26 in a downward direction prior to impacting of the workpiece 28 and upper draw ring 24 against the lower draw ring during operation of the press assembly 36 to the closed condition. In addition, the control assembly 30 is operable to effect deceleration of the draw ring 26 prior to stopping of the draw ring during operation of the press assembly 20 to the open condition. To accomplish this, the control assembly 36 transmits force between the cushion assembly 34 and the upper draw ring 24.

The control assembly 36 includes a piston and cylinder assembly 70. The piston and cylinder assembly 70 includes a cylinder 72 disposed in the base 22 and having a central axis extending parallel to a central axis of the cushion cylinder 42. A control piston 74 is disposed in the cylinder 72 and divides the cylinder into upper and lower variable volume chambers 76 and 78. The lower variable volume chamber 78 contains hydraulic fluid and is connected in fluid communication with the upper chamber 46 of the cushion assembly 34 through a conduit 80. The upper variable volume chamber 76 of the control assembly 36 is vented to the atmosphere.

A force transmitting member or pin 84 is engaged by a piston rod 86 connected with the control piston 74. The force transmitting member 84 transmits force between the upper draw ring 24 and the control assembly 36. The cylindrical force transmitting member 84 extends through a cylindrical opening 90 formed in the lower draw ring 26 and engages an upper end of the piston rod 86. Although it is preferred to form the force transmitting member 84 separately from the piston rod 86, it is contemplated that the piston rod 86 could be extended through the opening 90 so that the piston rod itself would function as the force transmitting member. If desired, the force transmitting member 84 and piston rod 86 could be disposed to one side of the lower draw ring 26 so that it would not be necessary to have an opening 90 extending through the lower draw ring 26.

It should be understood that although only a single control assembly 36 has been shown in FIG. 1, there are a plurality of identical control assemblies 36 arranged in a rectangular array about the periphery of the lower draw ring 26. The plurality of control assemblies are connected in fluid communication with and operable to transmit hydraulic fluid pressure forces to a plurality of cushion assemblies 34 which are also disposed in a rectangular array about the periphery of the lower draw ring 26.

Operation

When the press assembly 20 is in the open condition of FIG. 1, the upper draw ring 24 is spaced a substantial distance above the lower draw ring 26. The lower draw ring 26 is supported by the extended cushion assembly 34. At this time, the force transmitting member 84 projects upwardly from the upper side of the lower draw ring 26 toward the upper draw ring 24. The force transmitting member 84 is supported on the upper end of the piston rod 86 of the extended control piston and cylinder assembly 70.

The workpiece 28 is disposed between the upper and lower draw rings 24 and 26. The workpiece is supported by the lower draw ring 26 and is disposed inwardly of the force transmitting member 84. Thus, although the force transmitting member 84 extends into the opening 90 in the lower draw ring 26, the force transmitting member does not extend through the workpiece 28.

The cushion assembly 34 is maintained in the extended condition shown in FIG. 1 by the fluid pressure, that is, nitrogen gas pressure, in the lower variable volume chamber 48. The gas pressure in the lower variable volume chamber 48 and accumulator 52 is more than adequate to support the lower draw ring 26 and cushion piston 44. The control assembly 36 is maintained in the extended condition shown in FIG. 1 by hydraulic fluid pressure in the lower variable volume cylinder chamber 78. The fluid pressure in the variable volume cylinder chamber 78 is more than adequate to support the control piston 74 and force transmitting member 84.

When the press assembly 20 begins to operate from the open condition toward the closed condition, the drive assembly 32 moves the upper draw ring 24 downwardly toward the lower draw ring 26 in a known manner. At this time, the lower draw ring 26 is stationary in the initial position shown in FIG. 1. The cushion assembly 34 and control assembly 36 are in their extended conditions.

As the upper draw ring 24 moves toward the lower draw ring 26, the lower side of the upper draw ring 24 engages the force transmitting member 84. As the upper draw ring 24 moves into engagement with the force transmitting member 84, force is transmitted from the upper draw ring 24 to the cushion assembly 34 to initiate operation of the cushion assembly toward a retracted condition. A the cushion assembly 34 is retracted, the lower draw ring 26 is accelerated in a downward direction.

When the upper draw ring 24 engages the force transmitting member 84, the force transmitting member 84 is pressed downwardly against the piston rod 86 in the control assembly 36. The force applied against the piston rod 86 is transmitted to the piston 74. The piston 74 applies force against the hydraulic fluid in the lower variable volume chamber 78. The fluid pressure generated in the lower variable volume chamber 78 by the piston 74 causes hydraulic fluid to flow from the control assembly 36 through the conduit 80 to the cushion assembly 34.

The flow of fluid from the control assembly 36 to the cushion assembly 34 causes the cushion assembly to retract. Thus, hydraulic fluid flows from the conduit 80 into the upper variable volume chamber 46 of the cushion assembly 34. The fluid pressure in the upper variable volume chamber 46 causes the piston 44 to move downwardly and compress the gas in the lower variable volume chamber 48. As the piston 44 moves downwardly, the piston rod 68 and lower draw ring 26 move downwardly. This is because the lower draw ring 26 is supported on the piston rod 68 and is movable with the piston rod.

The speed of downward movement of the lower draw ring 26 is less than the speed of downward movement of the upper draw ring 24. Therefore, the upper draw ring and workpiece 28 impact against the slower moving lower draw ring 26. When the upper draw ring 24 impacts against the lower draw ring 26, the workpiece 28 is gripped between he draw rings and the draw rings move downwardly together. Since the lower draw ring 26 is moving downwardly when the upper draw ring 24 and workpiece 28 impact against the lower draw ring 26, the shock loading forces on the press assembly 20 are substantially less than would be the case if the lower draw ring 26 was stationary when the upper draw ring impacted with the lower draw ring. In addition to reducing shock loading forces, having the lower draw ring 26 moving downwardly when the upper draw ring 24 closes against it reduces tee amount of noise associated with operating the press assembly 20.

As the upper and lower draw rings 24 and 26 move downwardly together with the workpiece 28 gripped between them, the cushion assembly 34 and control assembly 36 are retracted at the same rate. This is because the cushion assembly piston 44 and the control assembly piston 74 move downwardly with the upper and lower draw rings 26 and 24 which are moving downwardly at the same speed. As the piston 44 in the cushion assembly 34 moves downwardly under the influence of force transmitted to the piston rod 68 from the lower draw ring 26, the gas in the lower variable volume chamber 48 is compressed. Since the rod end area of the cushion piston 44 is twice as great as the head end area of the control piston 74, the upper variable volume chamber in the cushion assembly 34 expands at a greater rate than the rate of contraction of the lower variable volume chamber 78 in the control assembly 36. This results in the occurrence of cavitation in the upper variable volume chamber 46 of the cushion assembly 34.

When cavitation occurs in the upper variable volume chamber 46, hydraulic fluid can flow from the accumulator 52 through the conduit 54 and check valve 58 to the upper variable volume chamber. However, the flow restrictor valve 56 is set to limit the rate of hydraulic fluid flow to a very small amount which, for all practical purposes, can be ignored. However, this rate of hydraulic fluid flow is adequate to compensate for any leakage which may occur in the system.

Since cavitation occurs in the upper variable volume chamber 46 of the cushion assembly 34, there is a relatively large pressure differential across the piston 44. This enables the cushion assembly 34 to provide a substantial upwardly directed and yieldable force opposing downward movement of the piston 44 as the gas in the lower variable volume chamber 48 is compressed. Due to the substantial pressure differential across the cushion piston 44, the cushion assembly 34 is operable to cushion shock loading on the components of the press assembly as the press assembly moves to the fully closed condition.

When the press assembly 20 is closed, the cushion assembly 34 is retracted. The control assembly 36 i also retracted. The upper and lower draw rings 24 and 26 are in their lowermost positions. At this time, the workpiece 28 has been fully deformed by a die during a stretch draw operation.

Immediately after the press assembly 20 reaches the closed condition, the press assembly 20 starts to operate back to the open condition. As the press assembly starts to open, the press drive assembly 32 moves the upper draw ring 24 upwardly away from the base 22. As the upper draw ring 24 moves upwardly away from the base 22, the cushion assembly 34 expands to move the lower draw ring 26 upwardly with the upper draw ring 24. Thus, gas pressure in the lower variable volume chamber 48 of the cushion assembly 34 presses the piston 44 upwardly to maintain the lower draw ring 26 in abutting engagement with the upper draw ring 24 and workpiece 28.

As the upper and lower rings 24 and 26 move upwardly together, the lower cushion chamber 48 expands and the upper cushion chamber 46 contracts. This results in the elimination of the cavitation which previously occurred in the upper cushion chamber 46. During this initial upward movement of the cushion piston 44, fluid is not pumped from the cushion assembly 34 to the control assembly and the control assembly 36 remains contracted.

As soon as the cavitation has been eliminated in the upper cushion chamber 46, hydraulic fluid is pumped from the upper cushion chamber through the conduit 80 to move the control piston upwardly 74. The hydraulic fluid pressure force applied against the control piston 74 is transmitted through the piston rod 86 and force transmitting member 84 to the upper draw ring 24 to urge the upper draw ring 24 upwardly. This results in the transmission of energy back to the drive assembly 32.

During continued operation of the press assembly 20 toward the open condition, the speed of upward movement of the lower draw ring 26 is decreased relative to the speed of movement of the upper draw ring 24. Thus, the lower draw ring 26 is decelerated relative to the upper draw ring 24. This results in the upper and lower draw rings 24 and 26 separating in a manner shown schematically in FIG. 6.

The deceleration of the lower draw ring 26 and separation of the upper and lower draw rings results from the fact that the rod end of the cushion piston 44 has a larger area than the head end of the control piston 74. Thus, once the cavitation has been eliminated in the upper cushion chamber 46, hydraulic fluid is pumped from the upper chamber in the cushion assembly 34 to the lower chamber 78 in the control assembly 36. The lower chamber 78 in the control assembly 36 expands at a rate which is determined by the speed of upward movement of the upper draw ring 24. Thus, for each increment of upward movement of the draw ring 24, the control piston 74 moves up one increment.

The gas in the lower cushion chamber 48 is constantly pressing the cushion piston 44 upwardly to pressurize the hydraulic fluid in the upper variable volume chamber 46 of the cushion assembly. This results in fluid pressure being transmitted through the conduit 80 to the lower control chamber 78. The hydraulic fluid pressure in the lower control chamber 78 presses the piston 74 and piston rod 86 upwardly to apply an upwardly directed force against the force transmitting member 84.

The force transmitting member 84 abuts the upper draw ring 24 and moves upwardly at the same speed as the upper draw ring 24. However, the speed of upward movement of the upper draw ring 24 is determined by the press drive 32. This results in the hydraulic fluid pressure in the lower chamber 78 of the control assembly being effective to apply force against the upper draw ring 24 urging the upper draw ring 24 upwardly. At this time, the rate of expansion of the cushion assembly 34 is retarded to one-half of the rate of expansion of the control assembly 36.

As the upper draw ring 24 continues to move upwardly, the cushion assembly 34 approaches a fully extended condition and the lower draw ring 26 approaches the initial or open press position shown in FIG. 1. When the cushion assembly 34 is fully extended, the upper draw ring 24 will have moved to its initial or open press position. The upward movement of the lower draw ring 26 is then stopped and the lower draw ring remains stationary in its initial position.

Since the lower draw ring 26 was decelerated to one-half of the speed of the upper draw ring 24, the inertia of the lower draw ring 26 is less than it would be if the lower draw ring 26 was moving at the same speed as the upper draw ring 24. Therefore, the tendency for the lower draw ring 26 to bounce when it is stopped at its initial open press position is substantially reduced. This results in a substantial reduction in the rebounding loads and vibrations to which the press assembly 20 is subjected.

After the lower draw ring 26 has reached the initial or open press condition, the upper draw ring 24 continues to move upwardly away from the lower draw ring 26 under the influence of the press drive assembly 32. This results in the upper draw ring 24 moving away from the force transmitting member 84. When the upper draw ring 24 reaches the open press or initial position of FIG. 1, upward movement of the upper draw ring 24 is stopped. Once the press assembly 20 has been operated to the open condition of FIG. 1, the deformed workpiece 28 can be readily removed from the press assembly 20.

The press assembly 20 has the same construction and mode of operation disclosed in U.S. patent application Ser. No. 429,200 filed Oct. 30, 1989 by John Terrell, Paul Kadis, Leonard Hiney, and Susan Pfaff and entitled "Press Assembly and Method of Operation". However, the cushion assembly 34 could be used in other known presses if desired.

Control Assembly

Second Embodiment

In the embodiment of the invention illustrated in FIG. 1, the control assembly 36 effects acceleration of the lower draw ring 26 after the upper draw ring 24 has engaged the force transmitting member 84. To reduce shock loading forces, the upper draw ring 24 and workpiece 28 impact against the lower draw ring 26 while the lower draw ring is moving at the speed to which it was accelerated by the control assembly 36. It is contemplated that the shock loading forces on the components of the press assembly 20 could be further reduced by effecting further acceleration of the lower draw ring 26 before the upper draw ring 24 and workpiece 28 impact with the lower draw ring 26.

In the embodiment of the control assembly which is partially illustrated in FIGS. 2–7, an improved control assembly is operable during closing and opening of the press assembly 20 to accelerate and decelerate the lower draw ring 26 in two distinct steps. Thus, during closing of the press assembly, the control assembly of FIGS. 2–7 accelerates the lower draw ring 26 to a first speed and then to a second speed before the upper and lower draw rings move together. Similarly, during opening of the press assembly 20, the control assembly of FIGS. 2–7 decelerates the lower draw ring 26 to a first speed and then decelerates the draw ring to a second speed prior to stopping of the draw ring at its initial position. Since the embodiment of the control assembly which is partially illustrated in FIGS. 2–7 is generally similar to the embodiment of the control assembly illustrated in FIG. 1, similar numerals will be utilized to designate similar components, the suffix letter "a" being associated with the numerals of FIGS. 2–7 to avoid confusion.

The improved control assembly 36a (FIG. 2) includes a two stage piston and cylinder assembly 70a constructed in accordance with the present invention. The piston and cylinder assembly 70a includes an inner piston 186 which is fixedly connected with piston rod 86a and a hollow outer piston 188 which encloses the inner piston 186. The cylindrical inner and outer pistons 186 and 188 have a limited range of movement relative to each other.

The outer piston 188 has a larger head end cross sectional area than the inner piston 186. Thus, the circular cross sectional area of the outer piston 188, as measured in a plane extending perpendicular to the longitudinal central axis 190 of the piston and cylinder assembly 70a, is twice as great as the circular cross sectional area of the inner piston 186 as measured in a plane extending perpendicular to the axis 190.

Figure 2:
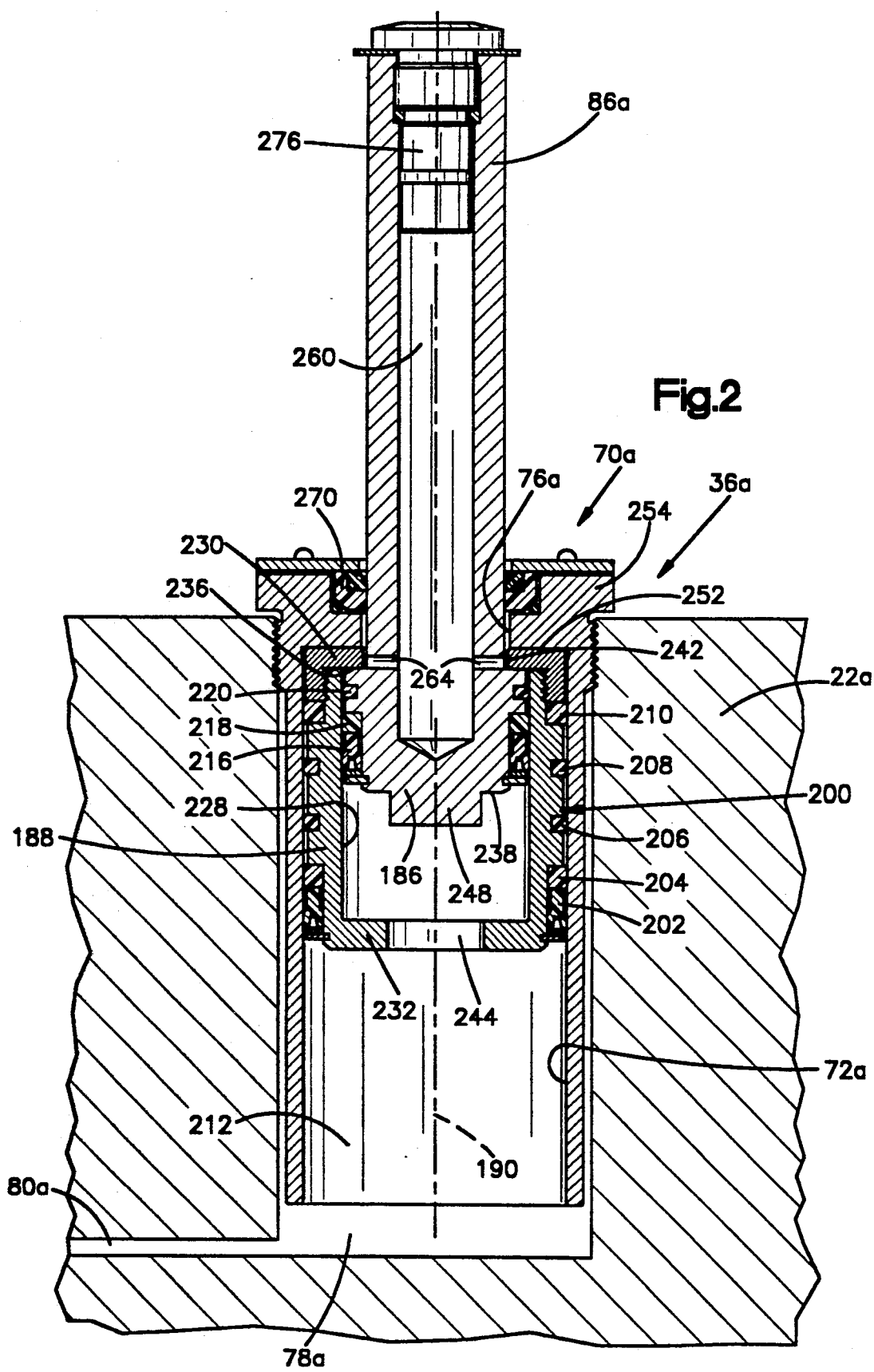
FIG. 2 is a fragmentary sectional view of a piston and cylinder assembly constructed in accordance with the present invention and which forms a second embodiment of the control assembly used in the press assembly of FIG. 1, the piston and cylinder assembly being shown in a fully extended condition.

In the specific embodiment of the control assembly 36a illustrated in FIG. 2, the cross sectional area of the inner piston 186 is one-third of the rod end area of the cushion piston 44 (FIG. 1). The cross sectional area of the outer piston 188 is two-thirds of the rod end area of the cushion piston 44. Of course, the areas of the pistons 186 and 188 could have a different relationship to each other and to the rod end area of the cushion piston 44.

Figure 5:
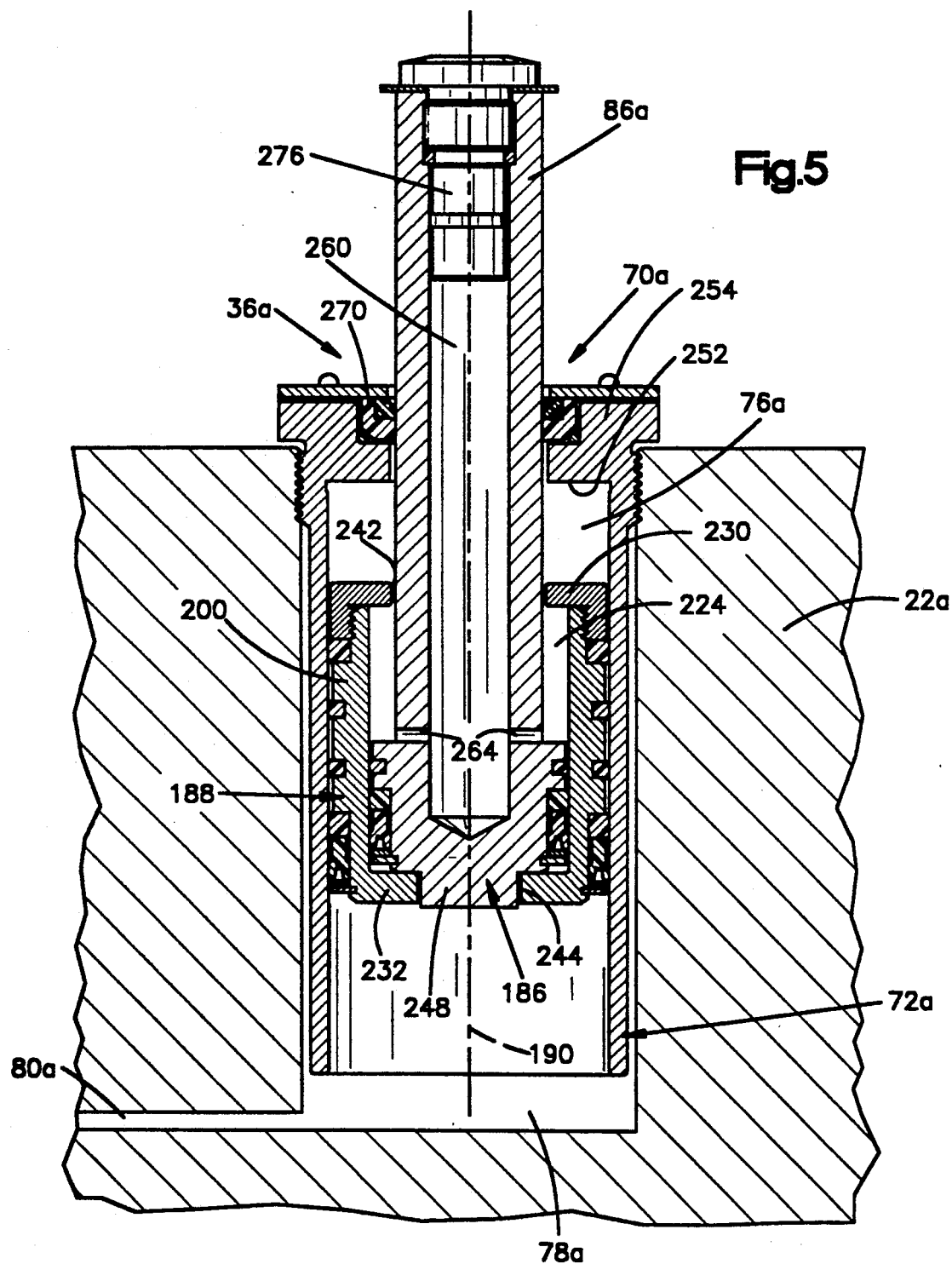
FIG. 5 is a sectional view, generally similar to FIG. 3, illustrating the manner in which the inner piston and hollow outer piston move together relative to the cylinder during a portion of an operating stroke of the piston and cylinder assembly.

During operation of the press assembly 20 (FIG. 1) from the open condition to the closed condition, the inner piston 186 is initially moved downwardly relative to the stationary outer piston 188 (FIG. 3) with the upper draw ring 24. This effects acceleration of the cushion piston 44 and lower draw ring 26 to a speed which is one-third of the speed of the upper draw ring 24. As the press assembly continues to close, the inner and outer pistons 186 and 188 move downwardly together (FIG. 5). Movement of the pistons 186 and 188 downwardly together forces fluid out of the control assembly 36a into the cushion assembly 34 to effect acceleration of the cushion piston 44 and lower draw ring 26 to a speed which is equal to two-thirds of the speed of the upper draw ring 24.

After the lower draw ring 26 has been accelerated to a speed which is equal to two-thirds of the speed of the upper draw ring 24, the upper draw ring and workpiece 28 impact against the lower draw ring. Since the lower draw ring 26 is moving downwardly at a speed which is equal to two-thirds of the downward speed of the upper draw ring 24 when the upper draw ring 24 closes against the lower draw ring 26, the shock loading to which the components of the press assembly are subjected is less than in the embodiment of the invention illustrated in FIG. 1.

Figure 6:
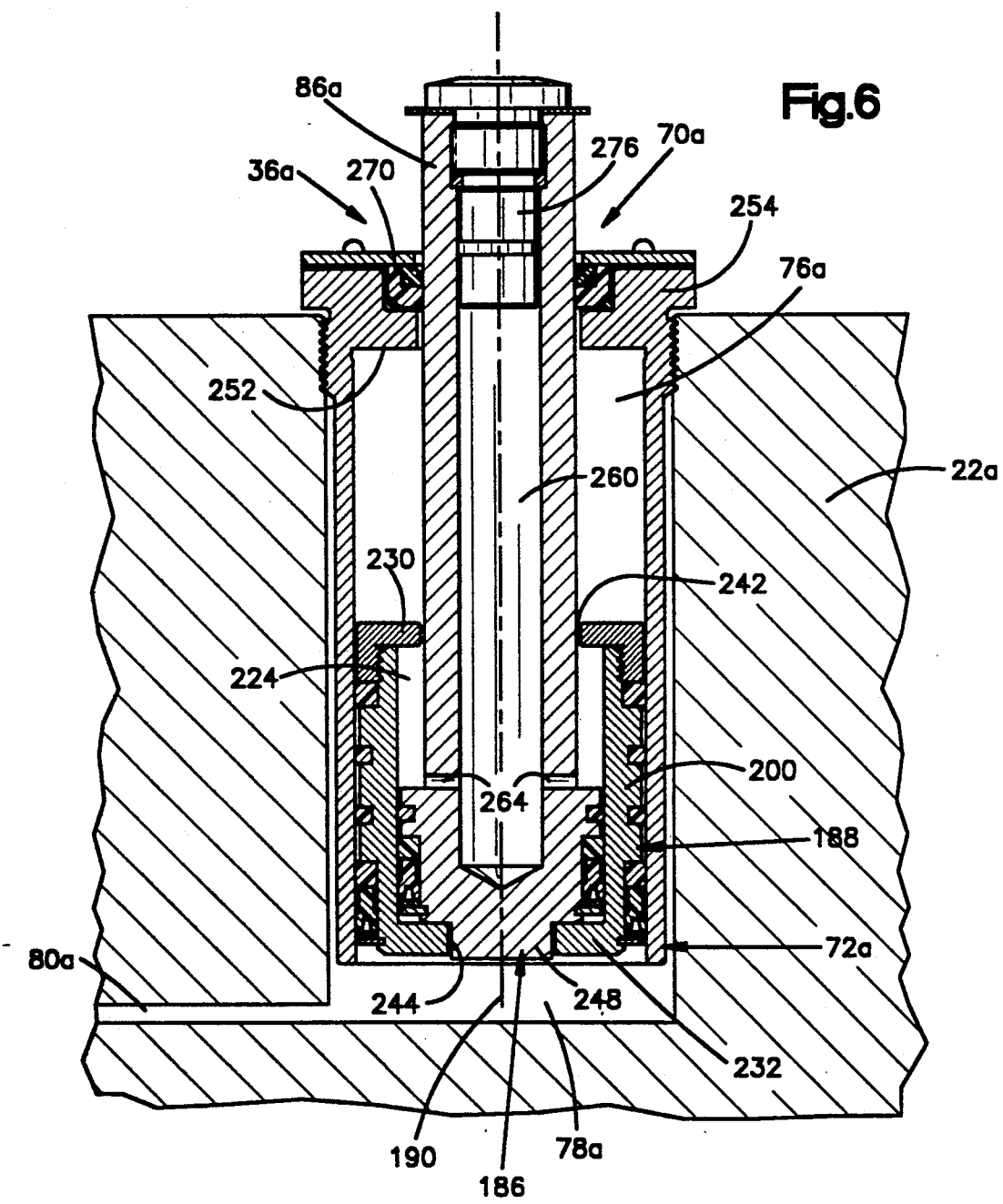
FIG. 6 is a sectional view, generally similar to FIG. 5, illustrating the piston and cylinder assembly in a fully retracted condition.

When the press assembly 20 is in the closed condition, the piston and cylinder assembly 70a is in the fully retracted condition of FIG. 6 with the inner and outer pistons 186 and 188 at their end of stroke positions. When the press assembly 20 is being operated from the closed condition back to the open condition of FIG. 1, the inner and outer pistons 186 and 188 cooperate to effect deceleration of the lower draw ring 26 and cushion piston 44 to a speed which is two-thirds of the speed of the upper draw ring 24. As the press assembly 20 continues to close, the inner piston 186 of the control assembly 36a effects deceleration of the cushion piston 44 and lower draw ring 26 to a speed which is only one-third of the speed of the upper draw ring 24.

During operation of the press assembly 20 (FIG. 1) from the closed condition to the open condition, the inner and outer pistons 186 and 188 move upwardly together (FIG. 5) from their lower end of stroke positions. The fluid pressure in the lower variable volume cylinder chamber 78a forces the hollow outer piston 188 to move upwardly with the inner piston 186 (FIG. 5). The speed of upward movement of the inner piston 186 is the same as the speed of upward movement of the upper draw ring 24. This effects deceleration of the cushion piston 44 and lower draw ring 26 from a speed which is equal to the speed of the upper draw ring 24 to a speed which is two-thirds of the speed of the upper draw ring.

As the press assembly continues to open, the outer piston 188 reaches its upper end of stroke position (FIG. 3) and the inner piston 186 moves upwardly relative to the stationary outer piston 188. This effects deceleration of the cushion piston 44 and lower draw ring 26 from a speed which is two-thirds of the speed of the upper draw ring 24 to a speed which is one-third of the speed of the upper draw ring.

After the lower draw ring 26 has been decelerated to a speed which is equal to one-third of the speed of the upper draw ring 24, the lower draw ring moves to its initial or open press position. Since the lower draw ring 26 is moving upwardly at a speed which is one-third the speed of the upper draw ring 24, the inertia of the lower draw ring is relatively small as it approaches its initial position. Therefore, rebounding of the lower draw ring 26 when it reaches its initial position and vibration of components of the press assembly are minimized.

Piston and Cylinder Assembly

The two stage piston and cylinder assembly 70a (FIG. 2) is constructed in accordance with the present invention and includes the cylindrical inner piston 186 which is enclosed by the cylindrical outer piston 188. The outer piston 188 includes a generally cylindrical wall 200 having a plurality of outer seals 202, 204, 206, 208 and 210 which engage a cylindrical inner side surface 212 of the cylinder 72a.

The annular lower seal 202 (FIGS. 2 and 4) is a high pressure seal which blocks fluid flow between the lower variable volume cylinder chamber 78a and the upper variable volume cylinder chamber 76a. An annular bearing ring 204 is disposed above the high pressure seal 202 and transmits force between the cylindrical sidewall 200 of the outer piston 188 and the cylinder wall 72a. An annular O-ring seal 206 further blocks fluid flow between the upper and lower variable volume cylinder chambers 76a and 78a. An annular wiper seal 208 is also provided. Finally, a second annular bearing ring 210 transmits force between the outer piston 188 and the cylinder wall 72a.

The inner piston 186 is disposed inside the outer piston 188. The inner piston 186 has a plurality of annular seals 216, 218 and 220 (FIGS. 2 and 4) which block fluid flow between upper and lower variable volume piston chambers 224 and 226 disposed inside the outer piston 188. Thus, the high pressure piston seal 216 engages the cylindrical inner sidewall 228 of the outer piston 188 to block fluid flow between the upper and lower piston chambers 224 and 226. The annular bearing ring 218 transmits force between the inner and outer piston 186 and 188. An annular wiper seal 220 further blocks fluid flow between the upper and lower piston chambers 224 and 226.

A pair of annular upper and lower flanges 230 and 232 extend radially inwardly from the cylindrical inner side surface 228 of the piston sidewall 200. The flanges 230 and 232 limit relative movement between the inner and outer pistons 186 and 188. Thus, when the inner and outer pistons 186 and 188 are at their upper end of stroke positions (FIG. 2), an annular upper side surface 236 on the inner piston 186 engages the radially inwardly projecting upper flange 230 to limit upward movement of the inner piston 186 relative to the outer piston 188. When the piston and cylinder assembly 70a is used for purposes other than as the control assembly 36a, the upper side surface 236 of the inner piston 186 may be used to apply force against the flange 230 to pull the inner piston 188 to the upper end of stroke position shown in FIG. 2.

Figure 3:
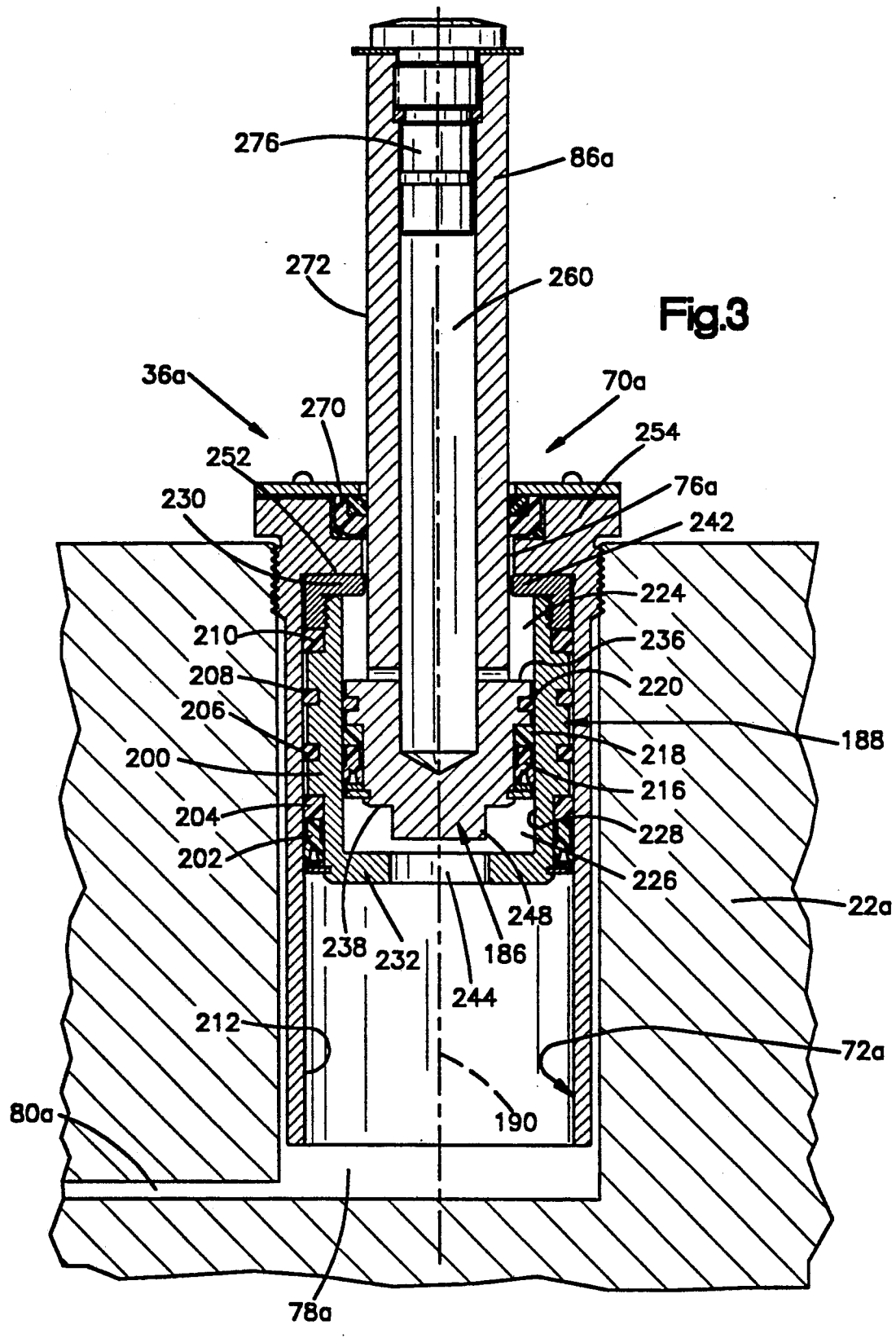
FIG. 3 is a sectional view, generally similar to FIG. 2, illustrating the manner in which an inner piston moves relative to a hollow outer piston during a portion of an operating stroke of the piston and cylinder assembly.
Figure 4:
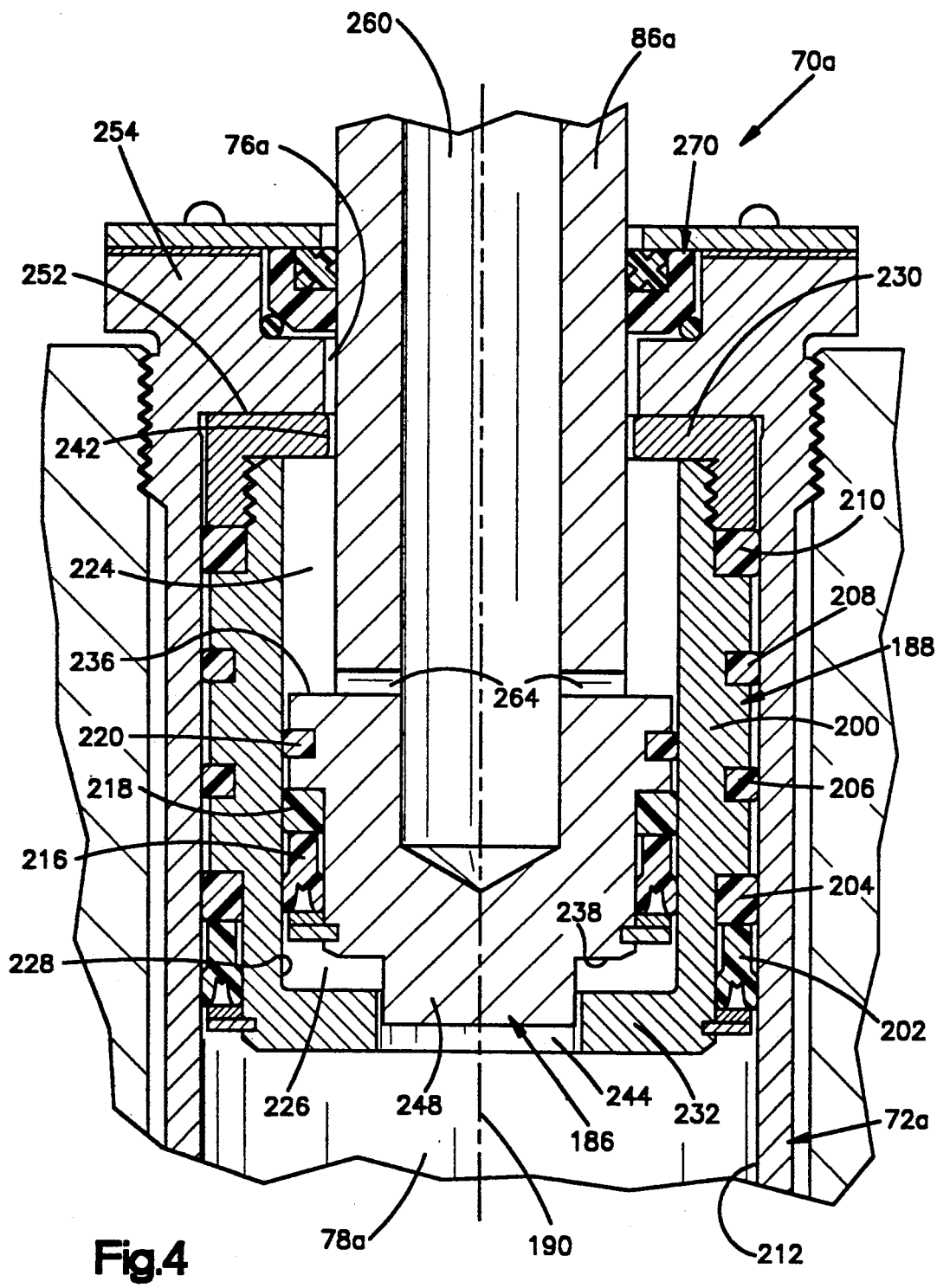
FIG. 4 is an enlarged fragmentary sectional view of a portion of the piston and cylinder assembly of FIG. 3, illustrating the manner in which a leading end portion of the inner piston moves into an opening in a flange at one end of the hollow outer piston to restrict fluid flow from a chamber in the hollow outer piston.

When the inner piston 186 is moved downwardly relative to the outer piston 188, that is from the position shown in FIG. 2 through the position shown in FIG. 3, an annular lower side surface 238 of the inner piston 186 moves into engagement with the lower flange on the outer piston 188. The inner piston 186 then applies force against the lower flange 232 (FIG. 5) to pull the outer piston 188 downwardly with the inner piston 186.

It should be understood that the annular flanges 230 and 232 could be utilized t transmit force between the inner piston 186 and the outer piston 188 to effect movement of the pistons either up or down. Thus, the annular lower flange 232 could press against the annular end surface 238 on the inner piston 186 to push the inner piston upwardly or the end surface 238 could press against the flange 232 to push the outer piston 188 downwardly. Similarly, the annular upper flange 230 could press against the annular end surface 236 on the inner piston 186 to push the inner piston downwardly or the end surface 236 could press against the flange 230 to push the outer piston 188 upwardly.

The annular flanges 230 and 232 have circular central openings 242 and 244 through which the upper and lower piston chambers 224 and 226 are connected in fluid communication with the upper and lower cylinder chambers 76a and 78a. The cylindrical piston rod 86a extends through the circular opening 242 (FIGS. 3 and 4) in the upper flange 230. An annular space is formed between the outside of the piston rod 86a and the flange 230 through which fluid can flow from the upper variable volume piston chamber 224 into the upper variable volume cylinder chamber 76a. Similarly, fluid can flow from the lower variable volume piston chamber 226 through the circular flange opening 244 into the lower variable volume cylinder chamber 78a.

During operation of the control assembly 36a, the inner piston 186 moves downwardly relative to the outer piston 188 from an upper end of stroke position (FIG. 2) adjacent to the upper flange 230 to a lower end of stroke position adjacent to the lower flange 232. As the inner piston 186 moves downwardly relative to the outer piston 188 and approaches the lower end of stroke position relative to the outer piston, a cylindrical leading end or nose portion 248 (FIG. 4) moves into the circular central opening 244 in the lower flange 232. As the leading end 248 of the inner piston 186 moves into the opening 244, fluid flow from the lower variable volume piston chamber 226 into the lower variable volume cylinder chamber 78a is restricted.

By restricting fluid flow between the variable volume piston chamber 226 and cylinder chamber 78a with the leading end 248 of the inner piston 186 (FIG. 4), impact forces of the inner piston 186 against the outer piston 188 are cushioned. Thus, a restricted fluid flow from the lower variable volume piston chamber 226 results in an increase in the fluid pressure in the lower variable volume piston chamber. This increased pressure causes the outer piston 188 to start to move downwardly, in the same direction as the inner piston 186, before the annular end surface 238 on the inner piston 186 engages the annular lower flange 232. This cushions shock loading between the inner and outer pistons 186 and 188 during operation of the press assembly 20 from the open condition to the closed condition.

If desired, the piston rod 86 could be provided with a stepped configuration so that the diameter of the piston rod increases adjacent to the annular end surface 236 of the inner piston 186. The stepped configuration of the piston rod 86a would retard fluid flow out of the upper variable volume piston chamber 224 into the upper variable volume cylinder chamber 76a. It should be understood that when the piston and cylinder assembly 70a are used in the control assembly 36a, the annular upper side surface 236 of the inner piston 186 impacts against the upper flange 230 to limit upward movement of the inner piston relative to the outer piston 188 only when the outer piston has reached its upper end of stroke position (FIG. 3) and the inner piston 186 is moving to its upper end of stroke position (FIG. 2).

During operation of the press assembly (20) from the closed condition to the open condition, hydraulic fluid pressure is transmitted from the cushion assembly 34 (FIG. 1) through the conduit 80a (FIG. 6) to the lower variable volume cylinder chamber 78a. The hydraulic fluid pressure in the lower variable volume cylinder chamber 78a urges both the inner and outer pistons 186 and 188 upwardly. The rate of upward movement of the inner piston 186 is limited by engagement of the piston rod 86a with the force transmitting member 84 and upper draw ring 24. Therefore, hydraulic fluid pressure in the lower variable volume cylinder chamber 78a continuously presses the outer piston 188 against the inner piston 186 as the press assembly 20 is operated from the closed condition to the open condition.

As the press assembly 20 (FIG. 1) is operated from the closed condition toward the open condition, the upper draw ring 24 is moved upwardly by the press drive 32. Fluid pressure in the lower variable volume cylinder chamber 78a (FIG. 6) urges the piston rod 86a upwardly to apply force against the force transmitting member 84 (FIG. 1) and upper draw ring 24. As the upper draw ring 24 and force transmitting member 84 move upwardly, the inner and outer pistons 186 and 188 move upwardly together from their lower end of stroke positions (FIG. 6). The inner and outer pistons 186 and 188 move through the intermediate position shown in FIG. 5 to a position in which the upper flange 230 on the outer piston 188 is disposed in abutting engagement with an annular end surface 252 on an end wall 254 of the cylinder 72a.

As the inner and outer pistons 186 and 188 move upwardly from the end of stroke position shown in FIG. 6 to the intermediate position shown in FIG. 5 under the influence of fluid pressure in the lower variable volume cylinder chamber 78a, air in the upper variable volume cylinder chamber 76a is compressed and flows into a generally cylindrical chamber 260 formed in the hollow piston rod 86a. Thus, as the size of the upper variable volume cylinder chamber 76a is decreased, fluid flows from the upper variable volume cylinder chamber through the upper flange opening 242 into the upper variable volume piston chamber 224. As the fluid pressure in the upper variable volume piston chamber 224 increases due to the decreasing size of the upper variable volume cylinder chamber 76a, air will flow through radially extending passages 264 formed in the lower piston rod 86a into the rod chamber 260.

A flow of air from the upper variable volume cylinder chamber 76a into the upper variable volume piston chamber 224 and into the rod chamber 260 continues until the outer piston 188 moves to its upper end of stroke position (FIG. 3). When the outer piston 188 reaches its upper end of stroke position, the upper piston flange 230 is disposed in abutting engagement with the inner side surface 252 on the upper end wall 254 of the cylinder 72a. At this time, the upper variable volume cylinder chamber 76a will have been reduced to a minimum, almost negligible, volume.

As the press 20 continues to open, the inner piston 186 moves upwardly relative to the outer piston 188 under the influence of the hydraulic fluid pressure in the lower variable volume cylinder chamber 78a. The upward movement of the inner piston 186 results in a reduction in the size of the upper variable volume piston chamber 224. As the size of the upper variable volume piston chamber 224 decreases, air flows from the upper variable volume piston chamber 224 through the openings 264 into the rod chamber 260.

When the inner and outer pistons 186 and 188 have both moved to their upper end of stroke positions (FIG. 2), the size of the upper variable volume piston chamber 224 and upper variable volume cylinder chamber 76a are a minimum. At this time, the fluid (air) pressure in the rod chamber 260 will be a maximum. While the inner and outer pistons 186 and 188 remain at their upper end of stroke positions (FIG. 2), there is no fluid flow into or out of the rod chamber 260.

Upon operation of the press 20 from the open condition toward the closed condition, the force transmitting member 84 (FIG. 1) moves the piston rod 86a (FIG. 2) downwardly to move the inner piston 186 from its upper end of stroke position through the intermediate position shown in FIG. 3. As this occurs, the size of the upper variable volume piston chamber 224 increases. As the size of the upper volume piston chamber 224 increases, air will flow from the rod chamber 260 through the radial passages 264 into the variable volume upper piston chamber 224.

During continued operation of the press assembly toward the open condition, the inner piston 186 engages the lower flange 232 on the outer piston 188. At this time, the size of the upper variable volume piston chamber 224 will is a maximum. However, the size of the upper variable volume cylinder chamber 76a increases as the inner and outer pistons 186 and 188 move downwardly together (FIG. 5). As this occurs, air flows from the rod chamber 260 through the radial openings 264, into the upper variable volume piston chamber 224 and into the upper variable volume cylinder chamber 76a.

The flow of air from the rod chamber 260 continues until the upper variable volume cylinder chamber 76a has reached its maximum size, that is, until the inner and outer pistons 186 and 188 reach their lower end stroke positions (FIG. 6). When he inner and outer pistons 186 and 188 reach their lower end of stroke positions, the size of both the upper cylinder chamber 76a and upper piston chamber 224 are a maximums. Therefore, fluid flow from the rod chamber 260 to the passages 264 into the upper piston chamber 224 and from the upper piston chamber 224 into the upper cylinder chamber 76a will stop. At this time, the fluid pressure in the rod chamber 260, upper piston chamber 224 and upper cylinder chamber 76a is a minimum since the volume of the upper piston chamber and upper cylinder chamber is a maximum. This minimum pressure is only slightly greater than atmospheric pressure.

A combined fluid pressure and dirt seal assembly 270 is provided between the piston rod 86a and the upper end wall 254 of the cylinder 72a. The seal assembly 270 blocks fluid flow between the upper variable volume piston chamber 76a and the atmosphere surrounding the piston cylinder assembly 70a. Thus, the seal assembly 270 sealingly engages the cylindrical outer side surface 272 of the piston rod 86a and sealingly engages the upper end wall 254 of the cylinder 72a. The seal assembly 270 has a construction which is the same as is disclosed in U.S. Pat. No. 4,765,227 issued Aug. 23, 1988 and entitled "Die Cylinder Assembly".

A combined pressure relief and check valve assembly 276 (FIG. 7) may be mounted in the upper end of the piston rod 86a. The combined pressure relief and check valve assembly includes a pressure relief valve member 280 and a check valve member 282. The pressure relief valve member 280 is operated from the closed condition shown in FIG. 7 to an open condition to vent excessive fluid pressure from the rod chamber 260. The check valve member 282 blocks fluid flow from the rod chamber 260 when the fluid pressure in the rod chamber exceeds atmospheric or ambient pressure. The check valve 282 enables fluid to flow from the environment around the piston cylinder assembly 70a into the rod chamber 260 when the fluid pressure in the rod chamber is below ambient or atmospheric pressure.

Figure 7:
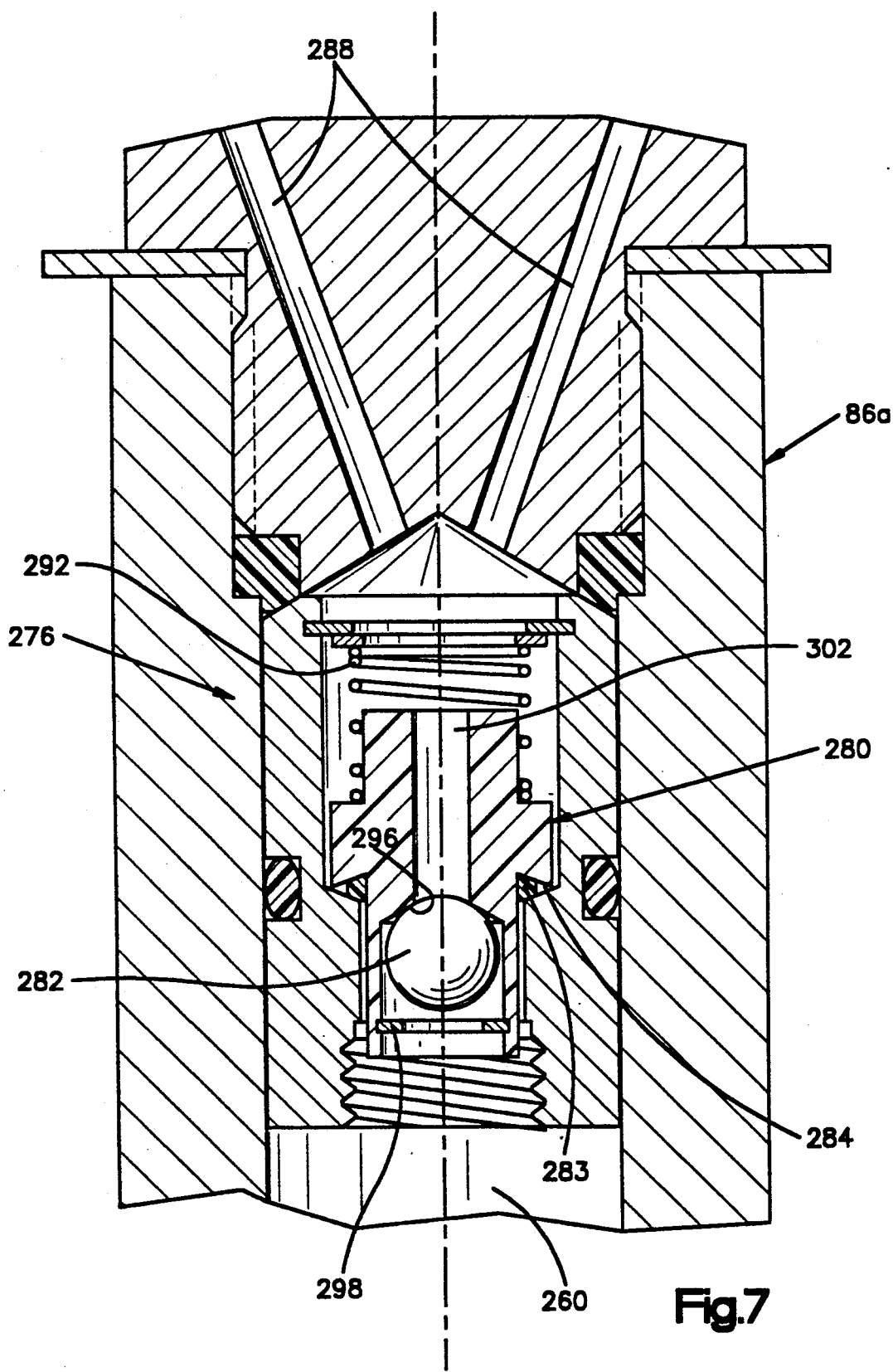
FIG. 7 is an enlarged fragmentary sectional view of a portion of the piston rod of the piston and cylinder assembly of FIGS. 2–6 and illustrating the construction of a check valve and pressure relief valve assembly mounted in the piston rod.

The pressure relief valve member 280 has an annular O-ring seal 283 which engages a conical valve seat 284 when the pressure relief valve member 280 is in the closed position of FIG. 7. Engagement of the O-ring seal 283 with the valve seat 284 blocks fluid flow from the rod chamber 260 through the combined pressure relief and check valve assembly 276 to passages 288 leading to the other side surface of the piston rod 86a and the environment around the piston rod. The pressure relief valve member 280 is urged to the closed position of FIG. 7 by a biasing spring 292.

When the fluid pressure in the rod chamber 260 exceeds a predetermined pressure, the pressure relief valve member 280 is moved upwardly against the influence of the biasing spring 292 to move the O-ring seal 283 away from the valve seat 284. This enables fluid to flow from the rod chamber 260 to the passages 288 to reduce the fluid pressure in the rod chamber. As soon as the fluid pressure in the rod chamber 260 has been reduced to a desired maximum pressure, the biasing spring 292 is effective to move the pressure relief valve member 280 back to its closed position.

The fluid pressure in the rod chamber 260 will be a minimum when the size of the upper cylinder chamber 76a and upper piston chamber 224 are a maximum, that is, when the inner and outer pistons 186 and 188 are at their lower end of stroke positions shown in FIG. 6. If the fluid pressure in the rod chamber 260 at this time is less than ambient or atmospheric pressure, the lightweight spherical check valve member 282 will fall downwardly away from a conical valve seat 296 onto an annular support member 298. When this happens, air can flow from the environment around the piston and cylinder assembly 70a, through the passages 288 and through a passage 302 formed in the pressure relief valve member 280 to the rod chamber 260. This prevents the fluid pressure in the rod chamber 260 being reduced to a fluid pressure which is less than atmospheric pressure due to a leakage of air past the seal 270 during operation of the piston and cylinder assembly 70a.

Due to the presence of the check valve 282, the fluid pressure in the rod chamber 260, upper cylinder chamber 76a and upper piston chamber 224 is maintained at or above atmospheric pressure during operation of the cylinder assembly. The construction and mode of operation of the combined pressure relief and check valve assembly 276 is the same as is disclosed in U.S. Pat. No. 4,765,227 issued Aug. 23, 1988 and entitled "Die Cylinder Assembly". If desired, the pressure relief and check valve assembly 276 could be omitted.

Conclusion

In view of the foregoing description, it is apparent that the present invention provides a new and improved piston and cylinder assembly 70a. The piston and cylinder assembly 70a includes a hollow outer piston 188 which is disposed in a cylinder 72a and cooperates with the cylinder to define variable volume cylinder chambers 76a and 78a. An inner piston 186 is disposed within the hollow outer piston 188 and cooperates with a cylindrical inner side surface 228 of the outer piston to define variable volume piston chambers 224 and 226. A piston rod 86a is connected with the inner piston 186 and extends from one end of the cylinder 72a.

The hollow outer piston 188 includes a first flange 230 which extends radially inwardly from the first end of the hollow outer piston. The hollow outer piston 188 also includes a second flange 232 which extends radially inwardly from a second end of the hollow outer piston. During a portion of an operating stroke of the piston cylinder assembly 70a, the inner piston 186 is moved relative to the outer piston 188. During another portion of an operating stroke of the piston cylinder assembly 70a, the inner piston 186 engages one of the two flanges 230 or 232 on the hollow outer piston 188 to move the hollow outer piston with the inner piston. When the hollow outer piston 188 moves with the inner piston 186, the effective area of the piston and cylinder assembly 70a is the combined areas of the two pistons. However, when the inner piston 186 moves relative to the outer piston 188, the effective area of the piston cylinder assembly 70a is only the area of the inner piston.

The improved piston and cylinder assembly 70a is advantageously used as a control assembly in a press 20. During operation of the press 20, upper and lower draw rings or members 24 and 26 move together and apply pressure to opposite sides of a workpiece 28. During operation of the press 20 from an open condition to a closed condition, the piston and cylinder assembly 70a effects movement of a draw ring 26 at a first speed and then accelerates the draw ring to a second speed before the two draw rings 24 and 26 move together.

Having described one specific preferred embodiment of the invention, the following is claimed:

1. An apparatus comprising a cylinder, a hollow outer piston disposed in said cylinder and cooperating with said cylinder to at least partially define first and second variable volume cylinder chambers, said hollow outer piston having cylindrical inner side surface, outer seal means connected with said hollow outer piston and disposed in sealing engagement with said cylinder to block fluid flow between said first and second variable volume cylinder chambers, an inner piston disposed in said hollow outer piston and cooperating with said cylindrical inner side surface to at least partially define first and second variable volume piston chambers, inner seal means connected with said inner piston and disposed in sealing engagement with said cylindrical inner side surface of said hollow outer piston to block fluid flow between said first and second variable volume piston chambers, a piston rod connected with said inner piston and extending from said inner piston through said first variable piston chamber and said first variable volume cylinder chamber to an outer end portion disposed adjacent to a first end of said cylinder, said hollow outer piston including first flange means extending radially inwardly from a first end portion of said cylindrical inner side surface of said hollow outer piston and circumscribing said piston rod, said first flange means including an inner side surface area facing toward said inner piston and engagable by a first end portion of said inner piston to limit movement of said inner piston in a first direction relative to said hollow outer piston, said first flange means including surface means cooperating with said piston rod to at least partially define a first piston opening for conducting fluid flow between said first variable volume piston chamber and said first variable volume cylinder chamber, said hollow outer piston including second flange means extending radially inwardly from a second end portion of said cylindrical inner side surface of said hollow outer piston at an end of said hollow outer piston opposite from said first flange means, said second flange means including an inner side surface area facing toward said inner piston and engagable by a second end portion of said inner piston to limit movement of said inner piston relative to said hollow outer piston, said second flange means including surface means which at least partially defines a second piston opening for conducting fluid flow between said second variable volume piston chamber and said second variable volume cylinder chamber, said inner and outer pistons being movable through operating strokes to vary the size of the first and second variable volume piston chambers and to vary the size of the first and second variable volume cylinder chambers, said inner piston being movable relative to said outer piston between a first condition in which said first end portion of said inner piston is disposed in engagement with said first flange means and said second end portion of said inner piston is spaced from said second flange means and a second condition in which said second end portion of said inner piston is disposed in engagement with said second flange means and said first end portion of said inner piston is spaced from said first flange means, said inner and outer pistons being movable together between a third condition in which said outer piston is disposed adjacent to the first end of said cylinder and a fourth condition in which said outer piston is disposed adjacent to a second end of said cylinder opposite from said first end of said cylinder, said piston rod including surface means for at least partially defining a rod chamber in said piston rod and for at least partially defining a passage connecting said rod chamber in fluid communication with said first variable volume piston chamber and said first variable volume cylinder chamber.

2. An apparatus as set forth in claim 1 wherein said inner piston includes an end portion which is movable into the second piston opening to restrict fluid flow from said second variable volume piston chamber to said second variable volume cylinder chamber prior to engagement of the second end portion of said piston with said second flange means.

3. An apparatus as set forth in claim 1 wherein said piston rod includes surface means defining a second passage in said piston rod extending between an outer side surface of said piston rod and the rod chamber for conducting fluid to said rod chamber when the fluid pressure in said first variable volume piston chamber and said first variable volume cylinder chamber is less than ambient fluid pressure, and check valve means disposed in said second passage for blocking the flow of fluid from said rod chamber to the outer side surface of said piston rod when the fluid pressure in the rod chamber exceeds ambient fluid pressure.

4. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, and control means for effecting operation of said cushion assembly to initiate movement of said second member in the first direction prior to movement of said first and second members together in the first direction during operation of said press assembly from the open condition toward the closed condition, said control means including a control cylinder, a hollow outer piston disposed in said control cylinder and cooperating with said control cylinder to at least partially define first and second variable volume cylinder chambers, an inner piston disposed in said hollow outer piston and cooperating with said hollow outer piston to at least partially define first and second variable volume piston chambers, means for connecting said first variable volume cylinder chamber in fluid communication with said first variable volume piston chamber, means for connecting said second variable volume cylinder chamber in fluid communication with said second variable volume piston chamber, conduit means for conducting fluid pressure between said cushion assembly and said second variable volume cylinder chamber, said inner piston being movable relative to said control cylinder and said outer piston to establish fluid flow from said control cylinder to said conduit means and from said conduit means to said cushion assembly at a first rate to effect operation of said cushion assembly and movement of said second member in the first direction at a first speed prior to movement of said first and second members together in the first direction during operation of said press assembly from the open condition toward the closed condition, said inner and outer pistons being movable together relative to said control cylinder to establish fluid flow from said control cylinder to said conduit means and from said conduit means to said cushion assembly at a second rate which is greater than the first rate to effect operation of said cushion assembly and movement of said second member in the first direction at a second speed which is greater than said first speed prior to movement of said first and second members together in the first direction during operation of said press assembly from the open condition toward the closed condition.

5. A press assembly as set forth in claim 4 further including a hollow piston rod connected with said inner piston and extending from said inner piston through said first variable volume cylinder chamber to an outer end portion disposed outside of said control cylinder adjacent to a first end portion of said control cylinder, said hollow piston rod including surface means for at least partially defining a rod chamber, passage means for connecting said rod chamber in fluid communication with said first variable volume piston chamber and in fluid communication with said first variable volume cylinder chamber, said first variable volume cylinder chamber being closed to block fluid flow to and from said first variable volume cylinder chamber other than between said first variable volume cylinder chamber and said rod and first variable volume piston chambers.

6. A press assembly as set forth in claim 5 wherein said passage means conducts fluid flow from said rod chamber to said first variable volume cylinder chamber and said first variable volume piston chamber during movement of said inner piston relative to said control cylinder and outer piston and during movement of said inner and outer pistons together relative to said cylinder.

7. A press assembly as set forth in claim 4 wherein said first and second members are movable together in a second direction opposite to the first direction during operation of said press assembly from the closed condition to the open condition, said first member being movable in the second direction away from said first member during operation of said press assembly from the closed condition to the open condition, said control means including means for opposing operation of said cushion assembly during movement of said first and second members together in the second direction to decrease the speed of movement of said second member in the second direction during operation of said press assembly from the closed condition to the open condition, said inner and outer pistons being movable together relative to said control cylinder to establish fluid flow from said cushion assembly to said conduit means and from said conduit means to said control cylinder at a third rate to effect operation of said cushion assembly and movement of said second member in the second direction at a third speed which is less than the speed of movement of said first member during operation of said press assembly from the closed condition to the open condition, said inner piston being movable relative to said control cylinder and said outer piston to establish fluid flow from said cushion assembly to said conduit means and from said conduit means to said control cylinder at a fourth rate which is less than the third rate to effect operation of said cushion assembly and movement of said second member in the second direction at a fourth speed which is less than the third speed during operation of said press assembly from the closed condition to the open condition.

8. A press assembly as set forth in claim 7 further including a hollow piston rod connected with said inner piston and extending from said inner piston through said first variable volume cylinder chamber to an outer end portion disposed outside of said control cylinder adjacent to a first end portion of said control cylinder, said hollow piston rod including surface means for at least partially defining a rod chamber, passage means for connecting said rod chamber in fluid communication with said first variable volume piston chamber and in fluid communication with said first variable volume cylinder chamber, said first variable volume cylinder chamber being closed to block fluid flow to and from said first variable volume cylinder chamber other than between said first variable volume cylinder chamber and said rod and first variable volume piston chambers, said passage means conducting fluid flow from said first variable cylinder chamber and said first variable volume piston chamber to said rod chamber during movement of said inner and outer pistons together relative to said control cylinder to establish fluid flow from said cushion assembly to said conduit means and from said conduit means to said control cylinder at the third rate.

9. A press assembly a set forth in claim 8 wherein said passage means conducts fluid flow from said first variable volume piston chamber to said rod chamber during movement of said inner piston relative to said control cylinder and outer piston to establish fluid flow from said cushion assembly to said conduit means and from said conduit means to said control at the fourth rate.

10. A press assembly as set forth in claim 7 wherein said inner and outer pistons are moved together relative to said control cylinder by fluid pressure conducted from said cushion assembly to said second variable volume cylinder chamber during operation of said cushion assembly and movement of said second member in the second direction at the third speed.

11. A press assembly as set forth in claim 4 wherein said inner piston is moved relative to said control cylinder and said inner and outer pistons are moved relative to said control cylinder by force transmitted from said first member to said inner piston during operation of said press assembly from the open condition toward the closed condition.

12. A press assembly as set forth in claim 4 wherein said second member includes surface means for defining an opening through said second member, said control means including means for transmitting force from said first member through said opening in said second member to said inner piston.

13. A press assembly as set forth in claim 4 wherein said first movable member is an upper draw ring and said second movable member is a lower draw ring, said upper and lower draw rings being disposed in abutting engagement with opposite sides of the workpiece to grip the workpiece during operation of said press assembly toward the closed condition and deformation of the workpiece.

14. A press assembly as set forth in claim 13 wherein said control means includes force transmitting means extending through said lower draw ring to transmit force from said upper draw ring to said inner piston.

15. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, said cushion assembly being operable from the retarded condition toward an extended condition during operation of said press assembly toward the open condition, and control means for retarding operation of said cushion assembly to effect movement of said second member in the second direction at a speed which is less than the speed of movement of said first member in the second direction during operation of said press assembly from the closed condition toward the open condition, said control means including a control cylinder, a hollow outer piston disposed in said control cylinder and cooperating with said control cylinder to at least partially define first and second variable volume cylinder chambers, an inner piston disposed in said hollow outer piston and cooperating with said hollow outer piston to at least partially define first and second variable volume piston chambers, means for connecting said first variable volume cylinder chamber in fluid communication with said first variable volume piston chamber, means for connecting said second variable volume cylinder chamber in fluid communication with said second variable volume piston chamber, conduit means for conducting fluid pressure between said cushion assembly and said second variable volume cylinder chamber, condition to the open condition, said inner and outer pistons being movable together relative to said control cylinder to enable fluid to flow from said cushion assembly to said conduit means and from said conduit means to said control cylinder at a first rate to effect operation of said cushion assembly and movement of said second member in the second direction at a first speed which is less than the speed of movement of said first member during operation of said press assembly from the closed condition to the open condition, said inner piston being movable relative to said control cylinder and said outer piston to enable fluid to flow from said cushion assembly to said conduit means and from said conduit means to said control cylinder at a second rate which is less than the first rate to effect operation of said cushion assembly and movement of said second member in the second direction at a second speed which is less than the first speed during operation of said press assembly from the closed condition to the open condition.

16. A press assembly as set forth in claim 15 wherein said control means includes force transmitting means for transmitting force from said inner piston to said first member during operation of said press assembly from the closed condition to the open condition.

17. A press assembly as set forth in claim 15 wherein said outer piston includes means for applying force against said inner piston under the influence of fluid pressure transmitted from said cushion assembly during operation of said press assembly from the closed condition to the open condition.

18. A press assembly as set forth in claim 15 wherein said second member includes surface means for defining an opening through said second member, said control means including means for transmitting force from said first member through said opening in said second member to said inner piston.

19. A press assembly as set forth in claim 15 wherein said first movable member is an upper draw ring and said second movable member is a lower draw ring, said upper and lower draw rings being disposed in abutting engagement with opposite sides of the workpiece to grip the workpiece during operation of said press assembly toward the closed condition and deformation of the workpiece.

20. A press assembly as set forth in claim 19 wherein said control means includes force transmitting means extending through said lower draw ring to transmit force from said upper draw ring to said inner piston.

21. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, and control means for effecting operation of said cushion assembly to initiate movement of said second member in the first direction prior to movement of said first and second members together in the first direction during operation of said press assembly from the open condition toward the closed condition, said control means including a control cylinder, an outer piston disposed in said control cylinder and cooperating with said control cylinder to at least partially define first and second variable volume cylinder chambers, an inner piston cooperating with said outer piston to at least partially define the first and second variable volume cylinder chambers, conduit means for conducting fluid pressure between said cushion assembly and said second variable volume cylinder chamber, said inner piston being movable relative to said control cylinder and said outer piston to establish fluid flow from said control cylinder to said conduit means and from said conduit means to said cushion assembly at a first rate to effect operation of said cushion assembly and movement of said second member in the first direction at a first speed prior to movement of said first and second members together in the first direction during operation of said press assembly from the open condition toward the closed condition, said inner and outer pistons being movable together relative to said control cylinder to establish fluid flow from said control cylinder to said conduit means and from said conduit means to said cushion assembly at a second rate which is greater than the first rate to effect operation of said cushion assembly and movement of said second member in the first direction at a second speed which is greater than said first speed prior to movement of said first and second members together in the first direction during operation of said press assembly from the open condition toward the closed condition, said inner and outer pistons including force transmitting surfaces which are disposed in abutting engagement to transmit force from said inner piston to said outer piston during movement of said inner and outer pistons together relative to said control cylinder.

22. A press assembly as set forth in claim 21 wherein said force transmitting surfaces on said inner and outer pistons are spaced apart during movement of said inner piston relative to said outer piston.

23. A press assembly as set forth in claim 21 wherein said outer piston is hollow and said inner piston is disposed in said hollow outer piston.

24. A press assembly as set forth in claim 21 wherein said second member includes surface mean for defining an opening through said second member, said control means including means for transmitting force from said second member through said opening in said second member to said inner piston.

25. A press assembly as set forth in claim 21 wherein said first movable member is an upper draw ring and said second movable member is a lower draw ring, said upper and lower draw rings being disposed in abutting engagement with opposite sides of the workpiece to grip the workpiece during operation of said press assembly toward the closed condition and deformation of the workpiece.

26. A press assembly as set forth in claim 25 wherein said control means includes force transmitting means extending through said lower draw ring to transmit force from said upper draw ring to said inner piston.

27. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, said cushion assembly being operable from the retracted condition toward an extended condition during operation of said press assembly toward the open condition, and control means for retarding operation of said cushion assembly to effect movement of said second member in the second direction at a speed which is less than the speed of movement of said first member in the second direction operation of said press assembly from the closed condition toward the open condition, said control means including a control cylinder, an outer piston disposed in said control cylinder and cooperating with said control cylinder to at least partially define first and second variable volume cylinder chambers, an inner piston cooperating with said outer piston to at least partially define the first and second variable volume cylinder chambers, conduit means for conducting fluid pressure between said cushion assembly and said second variable volume cylinder chamber, said inner and outer pistons being movable together relative to said control cylinder to enable fluid to flow from said cushion assembly to said conduit means and from said conduit means to said control cylinder at a first rate to effect operation of said cushion assembly and movement of said second member in the second direction at a first speed which is less than the speed of movement of said first member during operation of said press assembly from the closed condition to the open condition, said inner piston being movable relative to said control cylinder and said outer piston to enable fluid to flow from said cushion assembly to said conduit means and from said conduit means to said control cylinder at a second rate which is less than the first rate to effect operation of said cushion assembly and movement of said second member in the second direction at a second speed which is less than the first speed during operation of said press assembly from the closed condition to the open condition, said inner and outer pistons including force transmitting surfaces which are disposed in abutting engagement to transmit force from said inner piston to said outer piston during movement of said inner and outer pistons together relative to said control cylinder.

28. A press assembly as set forth in claim 27 wherein said force transmitting surfaces on said inner and outer pistons are spaced apart during movement of said inner piston relative to said outer piston.

29. A press assembly as set forth in claim 27 wherein said outer piston is hollow and said inner piston is disposed in said hollow outer piston.

30. A press assembly as set forth in claim 27 wherein said second member includes surface means for defining an opening through said second member, said control means including means for transmitting force from said first member through said opening in said second member to said inner piston.

31. A press assembly as set forth in claim 27 wherein said first movable member is an upper draw ring and said second movable member is a lower draw ring, said upper and lower draw rings being disposed in abutting engagement with opposite sides of the workpiece to grip the workpiece during operation of said press assembly toward the closed condition and deformation of the workpiece.

32. A press assembly as set forth in claim 31 wherein said control means includes force transmitting means extending through said lower draw ring to transmit force from said upper draw ring to said inner piston.

* * * * *

UNITED STATES PATENT AND TRADEMARK OFFICE
CERTIFICATE OF CORRECTION

PATENT NO. : 5,065,607
DATED : November 19, 1991
INVENTOR(S) : Paul M. Kadis, et al.

It is certified that error appears in the above-identified patent and that said Letters Patent is hereby corrected as shown below:

Column 23, Line 7, Claim 24, change "mean" to --means--.

Signed and Sealed this

Twenty-third Day of March, 1993

*Attest:*

STEPHEN G. KUNIN

*Attesting Officer*     *Acting Commissioner of Patents and Trademarks*